United States Patent
Rutter et al.

(10) Patent No.: US 6,682,221 B2
(45) Date of Patent: Jan. 27, 2004

(54) SEALING DEVICE FOR ROLLING BEARINGS

(75) Inventors: Andreas Rutter, Pinerolo (IT); Angelo Vignotto, Turin (IT); Claudio Savarese, Airasca (IT)

(73) Assignee: SKF Industrie S.p.A., Turin (IT)

( * ) Notice: Subject to any disclaimer, the term of this patent is extended or adjusted under 35 U.S.C. 154(b) by 8 days.

(21) Appl. No.: 10/090,878

(22) Filed: Mar. 4, 2002

(65) Prior Publication Data

US 2002/0131659 A1 Sep. 19, 2002

(30) Foreign Application Priority Data

Mar. 16, 2001 (IT) ................... TO2001A000245

(51) Int. Cl.[7] ............... F16C 32/00; G01P 3/48
(52) U.S. Cl. .................. 384/448; 324/174; 384/486
(58) Field of Search ............... 384/477, 484, 384/485, 486, 448; 324/173, 174, 207.25

(56) References Cited

U.S. PATENT DOCUMENTS

| | | | | |
|---|---|---|---|---|
| 5,530,344 A | * | 6/1996 | Caillaut et al. ............ | 324/174 |
| 5,674,011 A | * | 10/1997 | Hofmann et al. .......... | 384/448 |
| 5,762,425 A | * | 6/1998 | Ouchi ....................... | 384/448 |
| 5,852,361 A | * | 12/1998 | Ouchi et al. ............... | 324/174 |
| 6,186,667 B1 | * | 2/2001 | Nakamura et al. ......... | 384/448 |
| 6,323,640 B1 | * | 11/2001 | Forestiero et al. ......... | 324/174 |

* cited by examiner

Primary Examiner—Thomas R. Hannon
(74) Attorney, Agent, or Firm—Merchant & Gould, P.C.

(57) ABSTRACT

Sealing device (1) for a rolling bearing (2) which is provided with an inner race (5), which is axially blocked by a blocking element (4) which is suitable for being arranged in direct contact with a feedback element (6); the sealing device presents a support element (9) which is mounted on the inner race (5), an encoder wheel (8) which is installed on the inner race (5) and which is an integral part of the support element (9) itself, and a static sealing element (10), which is also an integral part of the support element (9) and which, in turn, presents two lips (21, 22) which are substantially parallel in relation to each other and which extend opposite the support element (9), a first lip (21) of the two lips (21, 22) extends towards the feedback element (6) and comes into contact with it, and a second lip (22) of the two lips (21, 22) extends towards a frontal surface of the inner race (5) and comes into contact with it.

9 Claims, 1 Drawing Sheet

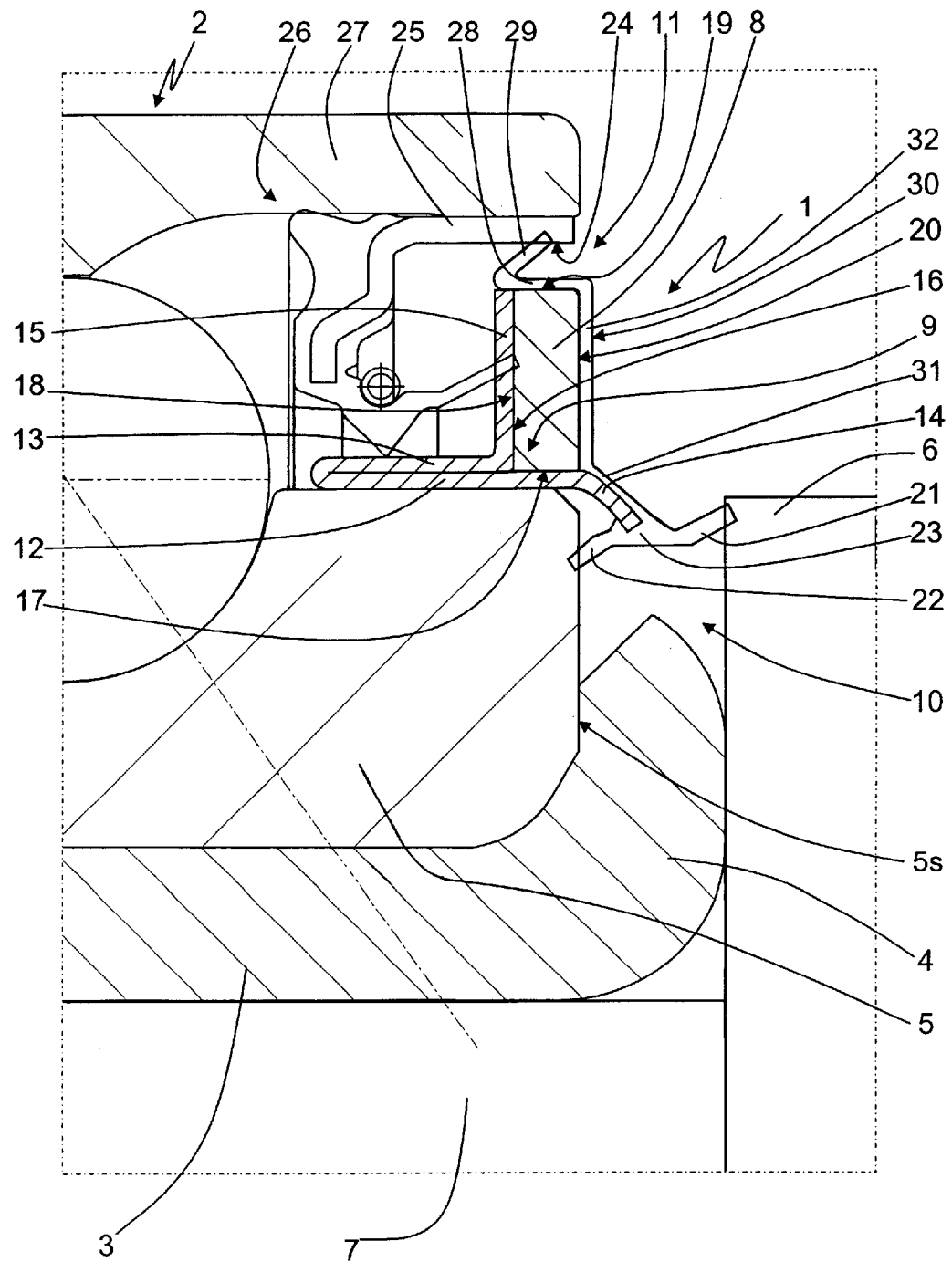

SEALING DEVICE FOR ROLLING BEARINGS

DESCRIPTION

The present invention relates to a sealing device for rolling bearings.

It should be pointed out that the present invention will make specific reference—without, however, losing any generality in any way—to a sealing device for a rolling bearing which is provided with an encoder wheel which is installed on an inner race of the rolling bearing itself, and is mounted on a cylindrical element which presents a blocking heading, which is arranged under the inner race and which is suitable for being arranged in direct contact with a shoulder of a motor shaft or of a joint.

In general, sealing devices of a well-known type comprise: a substantially rigid support which is coupled to the inner race of the rolling bearing, a static sealing lip which extends axially from the support beyond the blocking heading and which extends radially towards the inside in order to be compressed between the blocking heading and the shoulder, and an additional sealing element which is suitable for being mounted adjacent to the encoder wheel in order to protect the encoder wheel itself and in order to increase the insulating properties of the inside of the rolling bearing.

Sealing devices of the type described above present certain disadvantages, among which the following may be cited: the uncontrolled deformation of the lip when it is squeezed between the blocking heading and the shoulder, which causes a reduction in the sealing capacity of the lip itself; the slight protection which is afforded to the encoder wheel is compromised even further by the overall dimensions of the device; the relatively high number of components, which makes production costs quite high and which also complicates the assembly of the devices themselves.

The aim of the present invention is to produce a sealing device for rolling bearings which will resolve the above-described disadvantages in a simple and cost-effective fashion.

According to the present invention, a sealing device for a rolling bearing will be produced comprising an inner race which is axially blocked by a blocking element which is suitable for being arranged in direct contact with a feedback element, the sealing device comprises an encoder wheel which is installed on the inner race, a support element, which is mounted on the inner race and a static sealing element which is associated with the support element; the sealing device is characterised by the fact that the encoder wheel and the static sealing element are integral parts of the support element, and the static sealing element is frontally arranged in relation to the blocking element and comprises two lips which are substantially parallel in relation to each other and which extend opposite the support element, a first lip of the two lips extends towards the feedback element and comes into contact with it, and a second lip of the two lips extends towards a frontal surface of the inner race and comes into contact with it.

The present invention will now be described with reference to the attached drawing, which show an axial section, with some parts removed for reasons of clarity, of a preferred form of embodiment which is provided as an example of a non-limiting embodiment of the present invention.

With reference to the attached drawing, the number 1 refers to a sealing device for a rolling bearing 2 in its entirety.

It should be pointed out that the rolling bearing 2 is mounted on a cylindrical shell 3 which presents a blocking heading 4, which is arranged under an inner race 5 of the rolling bearing 2, and which is suitable for being arranged so that it comes into contact with a shoulder 6 of a shaft 7 which is inserted inside the shell 3.

The device 1 comprises a encoder wheel 8 which is installed on the inner race 5, a support element 9 which is mounted on the inner race, and two sealing elements 10 and 11 which are associated with the support element 9.

The support element 9 comprises two cylindrical walls 12 and 13, of which the wall 12 is directly mounted on the inner race 5 and presents an annular end 14 which extends outside the inner race 5 itself, while the wall 13 abuts the wall 12, and is connected to the wall 12 itself from the part opposite that of the annular end 14. The annular end 14 extends in staggered fashion from the inner race 5 and is radially orientated towards the inside and towards the blocking heading 4 in the gap which occurs between the inner race 5 itself and the shoulder 6.

Finally, the support element 9 comprises an annular wall 15, which is connected to the wall 13 and which is arranged in direct contact with the encoder wheel 8. It should be pointed out that the wall 15 and the wall 12, exactly before the annular end 14, define, in relation to each other, a fixing housing 16 for the encoder wheel 8, which presents an internal cylindrical surface 17 which is connected to the wall 12, and which also presents a lateral surface is which is transverse to the surface 17 itself and which is connected to the wall 15. Furthermore, the encoder wheel 8 presents another external cylindrical surface 19 which is substantially flush arranged with the end part of the wall 15, and another lateral surface 20, which is arranged parallel to the surface 18, and which determines the starting point of the annular end 14 of the wall 12.

The sealing element 10 is a static sealing element, and it is supported by the annular end 14 frontal to the blocking heading 4, in the gap which occurs between the shoulder 6 and the inner race 5, in order to be compressed between the shoulder 6 itself and the inner race 5 itself.

The element 10 is made of rubber, and it comprises two lips 21 and 22 which are substantially parallel in relation to each other, and a connecting portion 23 between the two lips 21 and 22.

It should be pointed out that the lip 21, which presents a greater length than the lip 22, extends from the portion 23 towards the shoulder 6 and comes into contact with it, and it is radially orientated opposite the blocking heading 4. On the other hand, the lip 22 extends from the portion 23 towards a frontal surface 5s of the inner race 5 and comes into contact with it, and it is radially orientated towards the blocking heading 4. Finally, the connecting portion 23 is arranged in direct contact with the annular end 14, and it is inclined in relation to each of the lips 21 and 22.

The sealing element 10 guarantees a static seal between the shoulder 6 and the inner race 5, and it prevents the entry of polluting agents into the gap which occurs between the sealing element 10 itself and the inner race 5 itself and also between the wall 12 and the inner race 5. The elastic deformation which is caused by the compression of the shoulder 6 in relation to the lip 21 determines an expansion in terms of the circumference of the lip 21 itself, and an elastic force reaction which, in turn, determines the adherence of the lip 21 to the shoulder 6 itself.

On the other hand, with regard to the staggered position of the annular end 14, the compression of the shoulder 6 in relation to the lip 21 determines a bending of the annular end 14 itself, with a consequent compression of the lip 21 when it comes into contact with the surface 5s.

The sealing element 11 is a dynamic sealing element, and it is arranged between the surface 19 of the wheel 8 and a cylindrical surface 24, which faces the surface 19 itself, and which radially limits towards the inside or, as illustrated, a shield 25 of a well-known kind of lining 26, or—according to a variation which is not illustrated—an outer race 27 of the rolling bearing 2. The sealing device 11 is also made of rubber, and it comprises a cylindrical wall 28 which is arranged in direct contact with the surface 19 of the encoder wheel 8 in order to protect the encoder wheel 8 itself, and it also comprises a lip 29, which is substantially parallel to the two lips 21 and 22 and which extends from the free end of the wall 15 towards the surface 24 and in sliding contact with it.

It is obvious from the above description that part of the surface 19 and the whole of the surface 20 are directly exposed to atmospheric agents, but it should be pointed out that, with a view to supplying adequate protection against such agents, the device 1 comprises a protective shield 30, which is made of the same material as the elements 10 and 11, and which provides a continuous connection between the elements 10 and 11 themselves.

It is clearly obvious, according to the above description, that the conformation of the sealing element 10 and the presence of the annular end 14 inside the sealing element 10 itself means that it is possible to effect a superior kind of control in relation to the deformation of the two lips 21 and 22 which results in an advantage in terms of the quality of the static seal of the two lips 21 and 22 themselves. Furthermore, the alternative of having, in a single component, the two sealing elements 10 and 11—which are respectively static and dynamic—as well as an encoder wheel 8 and a protective shield 30 which protects the encoder wheel 8 itself results in the simplification of the assembly of the sealing device 1 onto the rolling bearing 2, and also results in the fact that the production of the sealing device 1 itself may be carried out in an extremely cost-effective fashion.

The shield 30 comprises a wall 31 which is substantially conical and which is arranged in contact with the end 14 and which is closely connected with the end 14 itself, an annular wall 32 which is arranged in contact with the surface 20 and which is closely connected with the surface 20 itself, and a cylindrical wall which substantially coincides with the wall 28. In this way, the shield 30 completely closes the phonic encoder 5 inside the hosing 16 guaranteeing the best possible protection of the phonic encoder 5 itself.

It is not intended that the present invention be limited to the form of embodiment which has been herein described and illustrated. The said form of embodiment is to be taken as a non-limiting example of a sealing device 1, which might be subject to further modifications in relation to the shape and arrangement of the parts, as well as the details pertaining to construction and assembly.

What is claimed is:

1. Sealing device for a rolling bearing comprising an inner race which is axially blocked by a blocking element which is suitable for being arranged in direct contact with a feedback element, an encoder wheel which is installed on the inner race, a support element which is mounted on the inner race, and a static sealing element which is associated with the support element; wherein the encoder wheel and the static sealing element are integral parts of the support element, and the static sealing element is frontally arranged in relation to the blocking element and comprises two lips which are substantially parallel in relation to each other and which extend opposite the support element, a first lip of the two lips extends towards and contacts the feedback element, and a second lip of the two lips extends towards and contacts a frontal surface of the inner race.

2. Sealing device according to claim 1, wherein the support element comprises a cylindrical wall which is mounted on the inner race and which presents an annular end which extends outside the inner race and which is orientated towards the blocking element; and wherein the encoder wheel is integral to the cylindrical wall substantially in correspondence to the annular end, and the static sealing device is integral to the annular end.

3. Device according to claim 2, wherein the static sealing device comprises a linking portion between the two lips, the linking portion being inclined with regard to each of the two lips and being arranged in direct contact with the annular end of the cylindrical wall.

4. Device according to claim 2, wherein the first lip presents a length which is substantially greater than a length of the second lip, and is radially orientated opposite the blocking element.

5. Device according to claim 2, further comprising a first protective wall which is made of insulating material and which extends, at least from the said annular end, in continuous and substantially uniform fashion in direct contact with the encoder wheel.

6. Device according to claim 5, further comprising a second protective wall which is made of insulating material and which extends in continuous and substantially uniform fashion in contact with the encoder wheel and under an annular wall which is part of the support element and which is arranged in direct contact with the encoder wheel opposite the first protective wall in relation to the encoder wheel.

7. Device according to claim 6, wherein the first protective wall connects the static sealing device and the second protective wall to each other, and the first protective wall is made of the same material as the static sealing device and the second protective wall.

8. Device according to claim 2, further comprising a dynamic sealing element which is integral with the encoder wheel, and which is mounted in direct contact with an external cylindrical surface of the encoder wheel in order to radially extend towards the outside starting from the encoder wheel, and in sliding contact with a further cylindrical surface which is external to the encoder wheel.

9. Device according to claim 8, wherein the dynamic sealing element comprises a third lip, which is substantially parallel to the two lips, and which extends between the further external cylindrical surface and an annular wall of the support element which abuts the encoder wheel in order to protect the encoder wheel.

* * * * *